United States Patent
Hamana et al.

(10) Patent No.: US 8,078,022 B2
(45) Date of Patent: Dec. 13, 2011

(54) OPTICAL CABLE MODULE AND APPARATUS USING THE SAME

(75) Inventors: Kentaro Hamana, Nara (JP); Akira Enami, Nara (JP); Naru Yasuda, Uji (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 704 days.

(21) Appl. No.: 12/160,757

(22) PCT Filed: Jan. 11, 2007

(86) PCT No.: PCT/JP2007/050268
§ 371 (c)(1),
(2), (4) Date: Jul. 11, 2008

(87) PCT Pub. No.: WO2007/080932
PCT Pub. Date: Jul. 19, 2007

(65) Prior Publication Data
US 2010/0215315 A1 Aug. 26, 2010

(30) Foreign Application Priority Data
Jan. 11, 2006 (JP) .................. 2006-004064

(51) Int. Cl.
*G02B 6/26* (2006.01)
(52) U.S. Cl. ............... 385/32; 385/14; 385/15; 385/31; 385/47; 385/50; 385/51; 385/52; 385/115; 385/119
(58) Field of Classification Search .............. 385/14–15, 385/31–32, 47, 50–52, 115, 119
See application file for complete search history.

(56) References Cited

U.S. PATENT DOCUMENTS

| 5,966,478 | A | 10/1999 | Marcuse et al. |
| 6,081,638 | A * | 6/2000 | Zhou ............................. 385/31 |
| 7,162,127 | B2 * | 1/2007 | Ohtsu et al. .................... 385/49 |

(Continued)

FOREIGN PATENT DOCUMENTS
EP 0 177 928 4/1986
(Continued)

OTHER PUBLICATIONS
International Search Report (Japanese only) for PCT/JP2007/050268 mailed Feb. 20, 2007 (4 pages).
(Continued)

Primary Examiner — Brian M. Healy
Assistant Examiner — Guy Anderson
(74) Attorney, Agent, or Firm — Osha • Liang LLP

(57) ABSTRACT

An optical cable module is mainly provided with: an optical waveguide (10), a light-receiving element (11) and a supporting substrate (14) at its end portion of the light releasing side. The end portion of the optical waveguide (10) is fixed in its relative positional relationship with the light-receiving element (11). The end face of the optical waveguide (10) is not made perpendicular to the light axis (X-axis), and is diagonally cut so as to form an optical path conversion mirror (10D). Assuming that a light ray (indicated by a solid line in the Figure) that passes through the center of the light-axis cross section of a core (10A), and is reflected by the optical path conversion mirror (10D), and then reaches a light-receiving face at a light axis reflection position, the center of the light-receiving element (11) is placed with a gap from the light axis reflection position, in the optical cable module (1).

14 Claims, 14 Drawing Sheets

U.S. PATENT DOCUMENTS

| | | | |
|---|---|---|---|
| 7,496,266 B2 * | 2/2009 | Enami et al. | 385/130 |
| 7,551,829 B2 * | 6/2009 | Enami et al. | 385/141 |
| 7,657,140 B2 * | 2/2010 | Okuno et al. | 385/49 |
| 7,731,430 B2 * | 6/2010 | Ohtsu et al. | 385/88 |
| 7,865,046 B2 * | 1/2011 | Tanaka et al. | 385/36 |
| 7,907,802 B2 * | 3/2011 | Sano et al. | 385/14 |
| 2002/0181882 A1 * | 12/2002 | Hibbs-Brenner et al. | 385/52 |
| 2003/0010904 A1 * | 1/2003 | Luo | 250/227.11 |
| 2004/0202478 A1 * | 10/2004 | Melchior et al. | 398/141 |
| 2005/0201693 A1 * | 9/2005 | Korenaga et al. | 385/89 |
| 2007/0070173 A1 * | 3/2007 | Yamakawa et al. | 347/241 |

FOREIGN PATENT DOCUMENTS

| | | |
|---|---|---|
| JP | 55-48718 | 4/1980 |
| JP | 2-167508 | 6/1990 |
| JP | 4-30581 | 2/1992 |
| JP | 4-340509 | 11/1992 |
| JP | 11-23894 | 1/1999 |
| JP | 11-26783 | 1/1999 |
| JP | 11-153719 A | 6/1999 |
| JP | 2000-9968 | 1/2000 |
| JP | 2000-171671 | 6/2000 |
| JP | 2001-166186 | 6/2001 |
| JP | 2001-242331 | 9/2001 |
| JP | 2003-207694 | 7/2003 |
| JP | 2003-294992 | 10/2003 |
| JP | 2003-295000 | 10/2003 |
| JP | 2005-078027 A | 3/2005 |
| JP | 2005-164801 | 6/2005 |

OTHER PUBLICATIONS

Written Opinion of ISA (Japanese only) for PCT/JP2007/060268 mailed Feb. 20, 2007 (6 pages).

* cited by examiner

Center of light-receiving element | Center of light-receiving eleLight axis reflection position

OPTICAL CABLE MODULE AND APPARATUS USING THE SAME

TECHNICAL FIELD

The present invention relates to an optical cable module using an optical waveguide, and more particularly to an optical cable module using an optical waveguide having high flexibility.

BACKGROUND ART

In recent years, an optical communication network capable of executing data communication with a large capacity at high speeds has been expanded. It is expected that, from now on, this optical communication network will be installed not only among apparatuses, but also in apparatuses. Here, in order to achieve a printed circuit board by using optical wiring, an optical waveguide that can be formed into an array has been highly expected.

The optical waveguide is formed by a core having a high refractive index and a clad having a low refractive index, which is formed in contact with the periphery of the core so that a light signal that is made incident on the core is transmitted, while being repeatedly total-reflected by the border between the core and the clad.

Under these circumstances, recently, there have been strong demands for achieving a flexible optical wiring (in the same manner as in the electric wiring) to be installed in a bendable display and a smaller and thinner household apparatus, by using an optical waveguide. However, since the conventional optical waveguide, which is made from glass or a semiconductor, for example, like an optical coupler to be used for FTTHs, is poor in flexibility, and is not suitable for such applications. That is, film-shaped optical waveguides are demanded.

In particular, the inventors, etc. of the present application have developed an optical waveguide having high flexibility, as shown in FIG. 12, by using a further flexible material when compared with the conventional material, as the material for a core and a clad for the optical waveguide. By using this optically guided optical waveguide having high flexibility, even data transfer among substrates in an apparatus can be carried out by using optical waveguides.

In the case when this film optical waveguide having flexibility is used as an optical cable, it needs to be properly positioned, and photo-coupled with a photoelectric conversion element (light-receiving/emitting element). The light-receiving/emitting element is a device that converts an electric signal to a light signal and releases the resulting signal, and also receives a light signal and converts it to an electric signal. Moreover, upon coupling the optical waveguide to the photoelectric conversion element, a structure in which the end portion of the optical waveguide is diagonally cut off to form an optical path conversion mirror on the end face of the optical waveguide has often been used normally. In this optical waveguide having such an optical path conversion mirror, a signal light ray transmitted through the core is converted by the optical path conversion mirror in its proceeding direction, and made incident on a light-receiving element.

Patent Document 1: Japanese Patent Application Laid-Open "JP-A No. 2005-78027 (published on Mar. 24, 2005)"

Patent Document 2: Japanese Patent Application Laid-Open "JP-A No. 11-153719 (published on Jun. 8, 1999)"

DISCLOSURE OF THE INVENTION

In the case when an optical waveguide having high flexibility, as shown in FIG. 12, is used for data transfer among substrates in an apparatus, by making use of its high flexibility, an application for a flexible wiring to be used as portions that are frequently subjected to extending and bending operations (shape changes of the optical waveguide frequently occur), for example, a hinge portion or the like of a portable telephone, has been expected.

However, in the optical waveguide, changes in the light wave conditions tend to occur in the optical transfer medium (that is, the core) depending on the bent state of the optical waveguide. Moreover, these changes in the light wave conditions cause a change in the optical path conversion loss and a change in the spot-size mismatching loss. That is, in the conventional optical waveguide, a problem arises in which a large loss difference occurs due to the change in the optical waveguide. The following description will discuss this problem in detail.

First, signal light rays to be made incident on the core of an optical waveguide are directed as light rays that are virtually in parallel with the light axis of the core; however, actually, all signal light rays that are in parallel with the light axis of the core are not necessarily made incident thereon. That is, as shown in FIG. 13, signal light rays, transmitted through the optical waveguide, have an angle distribution to a certain degree relative to the light axis of the core. Here, those light rays that are not in parallel with the light axis of the core are transferred inside the core while being reflected by the border face between the core and the clad layer. At this time, if there is no bending in the optical path in the optical waveguide, with a linear optical path being maintained, the angle distribution of the signal light on the light-releasing side is made virtually the same as that on the light-incident side.

That is, in the case when there is no bending in the optical waveguide (see FIG. 14(a)), the light intensity distribution of the signal light on the light-receiving face forms one as shown in FIG. 14(b). In the light intensity distribution in this case, the angle distribution of the signal light is small, with the value of the peak quantity of light being large. Here, in FIG. 14, θ represents an angle made by the signal light and the light axis, θc represents a waveguide critical angle (critical angle on the interface between the core and the clad layer), and θc represents a mirror critical angle (critical angle in the optical path conversion mirror).

In contrast, as shown in FIG. 15, in the case when there is a bending in the optical path in the optical waveguide, the signal light has a change in its angle relative to the light axis due to reflection at this bent portion. This causes a change in the angle distribution of the signal light on the light-releasing side. More specifically, in the case when there is a bending in the optical waveguide, a signal transmitted through the optical waveguide is expanded in its angle distribution in its bending direction, while being transmitted through this bent portion. Here, the bending direction refers to a direction in parallel with the face including the bent light axis on the cross section perpendicular to the light axis of the optical waveguide.

In this manner, while the angle distribution of signal light is changed on the light-releasing side of the optical waveguide, the rate of the signal light to be taken out by the optical path conversion mirror is changed. That is, in the case of the optical path conversion mirror formed by diagonally cutting off the end portion of the optical waveguide, with respect to light rays that are made incident on the cut-off end face with an angle smaller than the critical angle, those light rays that are allowed to transmit the optical path conversion mirror are generated. Here, upon having a change in the angle distribution of the signal light on the light-releasing side, the distribution of incident angle of light onto the optical path conversion mirror is of course changed, resulting in a change in the rate of the signal light to be transmitted through the optical path conversion mirror. More specifically, as the angle distribution of the signal light expands, the rate of the signal light to be transmitted through the optical path conversion mirror increases. That is, the optical path conversion loss in the optical path conversion mirror increases.

That is, in the case when the optical waveguide is bent (see FIGS. 14(c) and 14(e)), the light intensity distribution of the signal light on the light-receiving face forms one as shown in each of FIGS. 14(d) and 14(f). In the light intensity distribution of each of these cases, the angle distribution of the signal light becomes larger, with the value of the peak quantity of light being made smaller. Moreover, since the angle distribution of the signal light becomes larger, the optical path conversion loss of the optical path conversion mirror increases (in FIGS. 14(b), 14(d) and 14(f), a hatched portion with slanting lines indicates an optical path conversion loss area in the optical path conversion mirror). Moreover, in the case when the bent portion of the optical waveguide is located close to the output end (see FIGS. 14(c) and 14(d)), in addition to the expansion of the angle distribution of the signal light, a gap in the peak position also occurs; however, in the case when the bent portion of the optical waveguide is separated from the output end to a certain degree (see FIGS. 14(e) and 14(f)), only the expansion of the angle distribution of the signal light occurs.

Moreover, when the angle distribution of the signal light is expanded on the light-releasing side, a releasing-light profile of the released signal light from the optical waveguide to be projected onto the light-receiving face is changed. As a result, a spot-size mismatching loss occurs in the light-receiving element.

In this manner, the optical path conversion loss and the spot-size mismatching loss of the signal light due to a shape change of the optical waveguide causes a variation in quantity of signal light to be detected by the light-receiving element. In the case when the variation in quantity of signal light to be detected is large, it is necessary to provide a function for adjusting a gain or the like, so as to expand a dynamic range in the light-receiving unit. As a result, the apparatuses using the above-mentioned optical waveguide tend to have increases in the size, costs and power consumption. This causes great difficulties in utilizing an optical waveguide for data transfer among substrates, in household apparatuses including, for example, portable telephones.

The present invention has been devised in view of the above-mentioned problems, and its objective is to achieve an optical cable module that can suppress variations in light quantity of signal light caused by a shape change in an optical waveguide.

In order to achieve the above-mentioned objective, an optical cable module according to the present invention is provided with: a core; a clad layer that surrounds the core around the light axis of the core; an optical waveguide in which an optical path conversion mirror that converts the optical path of signal light by light reflection on the end face thereof is formed on at least one end portion thereof; and a light-receiving element that has a fixed positional relationship relative to the end portion of the optical waveguide, and this structure is characterized in that the center of the light-receiving element is placed with a gap from a first position at which light transmitted through the center of the cross section of the light axis of the core is reflected by the optical path conversion mirror to reach the light-receiving face.

When there is a bending in the optical waveguide, the angle distribution of signal light that proceeds through the optical waveguide is expanded, with the result that a comparatively large area is generated as an area where the signal light is cut off by the optical path conversion mirror. For this reason, when a light-receiving profile without a bending is compared with a light-receiving profile with a bending, the area becomes larger in the light-receiving profile with the bending; however, even the light-receiving profile with the bending is not expanded toward the side on which the area is cut off by the optical path conversion mirror.

For this reason, when the light-receiving face of the light-receiving element is expanded so as to include the light-receiving profile with a bending in the optical waveguide, with the center of the light-receiving element being made coincident with the center of the light axis reflection as in the case of conventional devices, the light-receiving element is expanded to the area where signal light is cut off by the optical path conversion mirror. This causes difficulties in miniaturizing the optical cable module, and also causes a reduction in the response speed of the light-receiving element.

In contrast, in accordance with the above-mentioned structure, the center of the light-receiving element is placed with a gap from a first position (light axis reflection position) at which light transmitted through the center of the cross section of the light axis of the core is reflected by the optical path conversion mirror to reach the light-receiving face. With this arrangement, in the light-receiving element, the area where signal light is cut off by the optical path conversion mirror is made as small as possible so as not to be included therein, and both of the light-receiving profile without a bending in the optical waveguide and the light-receiving profile with a bending in the optical waveguide can be received without causing a spot size mismatching loss.

Moreover, in order to achieve the above-mentioned objective, another optical cable module according to the present invention is provided with: a core; a clad layer that surrounds the core around the light axis of the core; an optical waveguide in which an optical path conversion mirror that converts the optical path of signal light by light reflection on the end face thereof is formed on at least one end portion thereof; and a light-receiving element that has a fixed positional relationship relative to the end portion of the optical waveguide, and this structure is characterized in that the optical path conversion mirror is formed in such a manner that the output light of the optical waveguide is made virtually uniform regardless of the presence or absence of a bending in the optical waveguide.

With this arrangement, since the output light of the optical waveguide is made virtually uniform regardless of the presence or absence of a bending in the optical waveguide, the quantity of received light in the light-receiving element can be made uniform.

BRIEF DESCRIPTION OF THE DRAWINGS

FIG. 1(a) is a cross-sectional view that shows an essential structure of an optical cable module in accordance with embodiment 1. FIG. 1(b) is a diagram that shows a positional relationship between a light intensity distribution of signal light and a light-receiving element light on a light-receiving face of the optical cable module.

FIG. 4(a) is a cross-sectional view that shows a modified example of the optical cable module in accordance with embodiment 1. FIG. 4(b) is a diagram that shows light intensity distributions of signal light rays on the light-receiving face in both of the states where there is a bending and where there is no bending in the optical waveguide of the optical cable module.

FIG. 5(a) is a cross-sectional view that shows an essential structure of an optical cable module in accordance with embodiment 2. FIG. 5(b) is a diagram that shows a relationship between a light intensity distribution of a signal light ray in a waveguide and a guided light distribution area taken out by an optical path conversion mirror, in the optical cable module.

FIG. 8(a) is a cross-sectional view that shows a modified example of an optical cable module in accordance with embodiment 2. FIG. 8(b) is a diagram that shows a relationship between a light intensity distribution of a signal light ray in a waveguide and a guided light distribution area taken out by an optical path conversion mirror, in the optical cable module.

BEST MODE FOR CARRYING OUT THE INVENTION

Embodiment 1

Referring to drawings, the following description will discuss one embodiment of the present invention. First, referring to FIGS. 1(a) and 1(b), one structural example of an optical cable module according to embodiment 1 will be described.

Figure 1A:
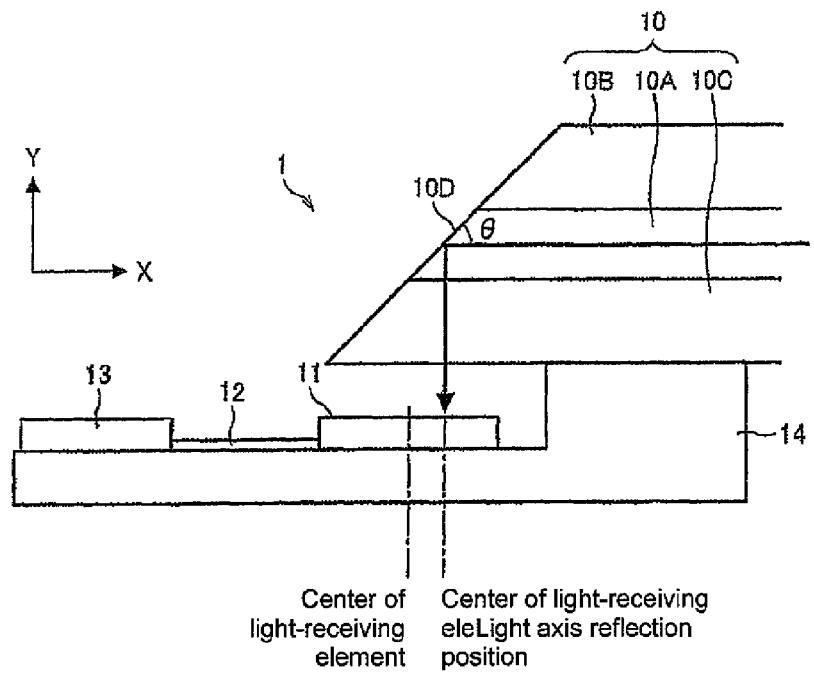
FIGS. 1(a) and 1(b) show an embodiment of the present invention.

An optical cable module 1 shown in FIG. 1(a) is mainly configured by an optical waveguide 10, a light-receiving element 11 and a supporting substrate 14 on its end portion on the light-releasing side. The end portion of the optical waveguide 10 is secured onto the supporting substrate 14 by a bonding process or the like, and the end portion of the optical waveguide 10 and the light-receiving element 11 are secured in the relative positional relationship thereof. Moreover, the optical cable module 1 may be provided with an electric wire 12 and an electrical connection unit 13 so as to easily take out an electric signal outputted by the light-receiving element 11.

Here, the end portion of the optical cable module 1 on the reversed side is provided with a light-emitting element in place of the light-receiving element 11 so that a signal incident side end portion is formed. The same structure as that of a conventional optical cable module may be used as the signal incident end portion.

First, the optical waveguide 10 is configured by a core 10A, an upper clad layer 10B and a lower clad layer 10C. That is, the optical waveguide 10 has a laminated structure in which the core 10A is sandwiched by the upper clad layer 10B and the lower clad layer 10C. A light signal to be transmitted by the optical waveguide 10 is allowed to proceed the inside of the core 10A, while being reflected by the interface between the core 10A and the upper clad layer 10B or by the interface between the core 10A and the lower clad layer 10C. Here, in FIG. 1(a), in the vicinity of the end portion of the optical waveguide 10, the longitudinal direction (light axis direction) of the optical waveguide 10 is defined as an X-axis direction, and the lamination direction of the core 10A, the upper clad layer 10B and the lower clad layer 10C is defined as a Y-axis direction.

The end face of the optical waveguide 10 is not perpendicular to the optical axis (X-axis), and is diagonally cut off to form an optical path conversion mirror 10D. More specifically, the end face of the optical waveguide 10 is made perpendicular to the XY plane, and inclined so as to make an angle θ (θ<90°) relative to the X-axis. Thus, a signal light ray, transmitted through the core 10A, is reflected by the optical path conversion mirror 10D, and changed in its proceeding direction to be released toward the light-receiving element 11. Here, the inclination angle θ of the optical path conversion mirror 10D is normally set to 45° so that the positioning process between the optical path conversion mirror 10D and the light-receiving element 11 is easily carried out. Here, the optical path conversion mirror may be designed so that a mirror unit is externally attached to the end portion of the optical waveguide 10.

The point to which attention should be drawn in the optical cable module 1 is the positional relationship between the optical waveguide 10 and the light-receiving element 11. That is, with respect to the positional relationship between the optical waveguide having an optical path conversion mirror and the light-receiving element, conventionally, assuming that there is light (indicated by a solid line in the Figure) that passes through the center of the cross section of the light axis of the core 10A, a position (hereinafter, referred to as a light axis reflection position) at which, after having been reflected by the optical path conversion mirror, this light reaches the light-receiving face is defined as the center position of the light-receiving element. In contrast, the optical cable module 1 according to the present embodiment is characterized in that the center of the light-receiving element 11 is placed so as to deviate from the light axis reflection position.

More specifically, in the optical cable module 1, the center of the light-receiving element 11 is allowed to deviate from the light axis reflection position toward the end portion side of the optical waveguide 10. Here, the following description will discuss reasons why the center of the light-receiving element 11 is placed so as to deviate from the light axis reflection position, in detail.

Figure 2A:
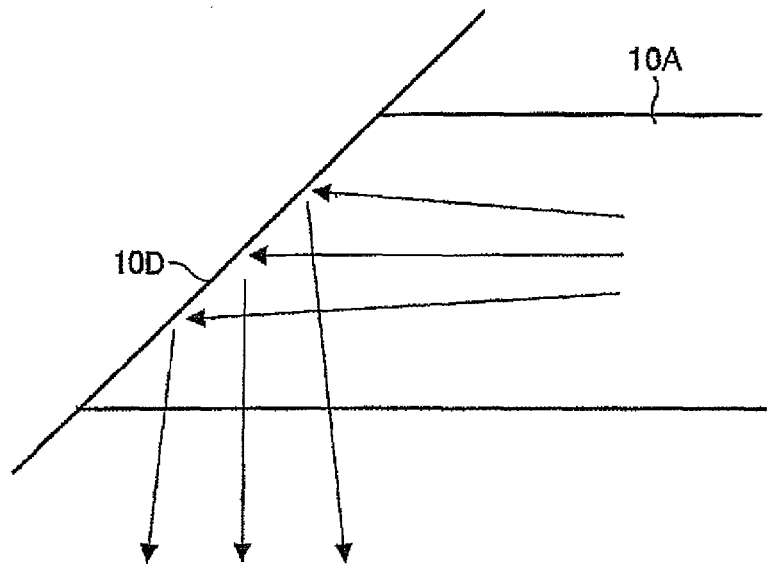
FIG. 2(a) is a diagram that shows a reflection state by an optical path conversion mirror in a state where there is no bending in an optical waveguide.
Figure 2B:
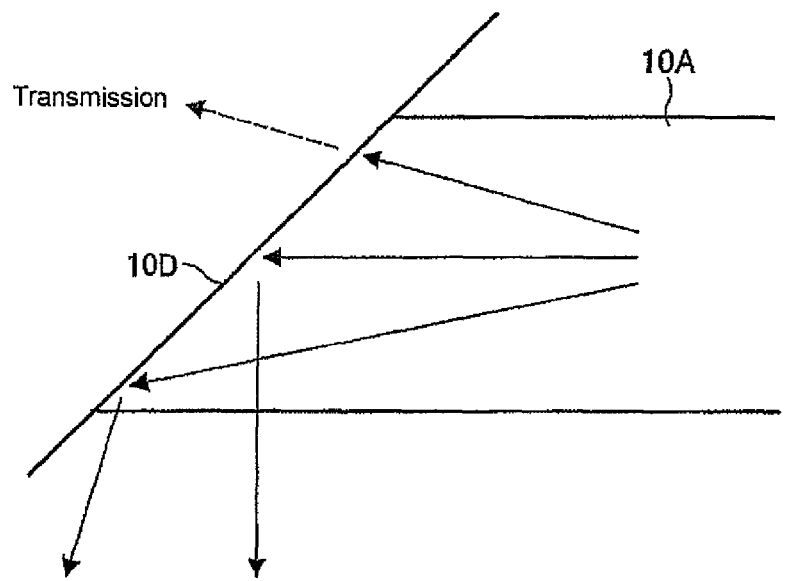
FIG. 2(b) is a diagram that shows reflection state by the optical path conversion mirror in a state where there is a bending in the optical waveguide.

First, FIG. 2(a) shows a reflection state by the optical path conversion mirror in a state where there is no bending in the optical waveguide 10, that is, in a state where an angle distribution of a signal light ray transmitted through the optical waveguide 10 is small. Moreover, FIG. 2(b) shows a reflection state by the optical path conversion mirror in a state where there is a bending in the optical waveguide 10, that is, in a state where an angle distribution of a signal light ray transmitted through the optical waveguide 10 is large.

In the state where there is no bending in the optical waveguide 10, as shown in FIG. 2(a), almost all the signal light rays that are made incident on the optical path conversion mirror 10D satisfy total reflection conditions of the optical path conversion mirror 10D (that is, made incident on the end face forming the optical path conversion mirror with an angle lower than the critical angle), and converted in its optical path toward the light-receiving side. In contrast, in the state where there is a bending in the optical waveguide 10, as shown in FIG. 2(b), since the angle distribution of signal light rays to be made incident on the optical path conversion mirror 10D expands, with the result that light rays that fail to satisfy the total reflection conditions of the optical path conversion mirror 10D are generated. In other words, in the state where there is a bending in the optical waveguide 10, one portion of the signal light rays to be made incident on the optical path conversion mirror 10D is cut off without being reflected by the optical path conversion mirror.

Figure 1B:
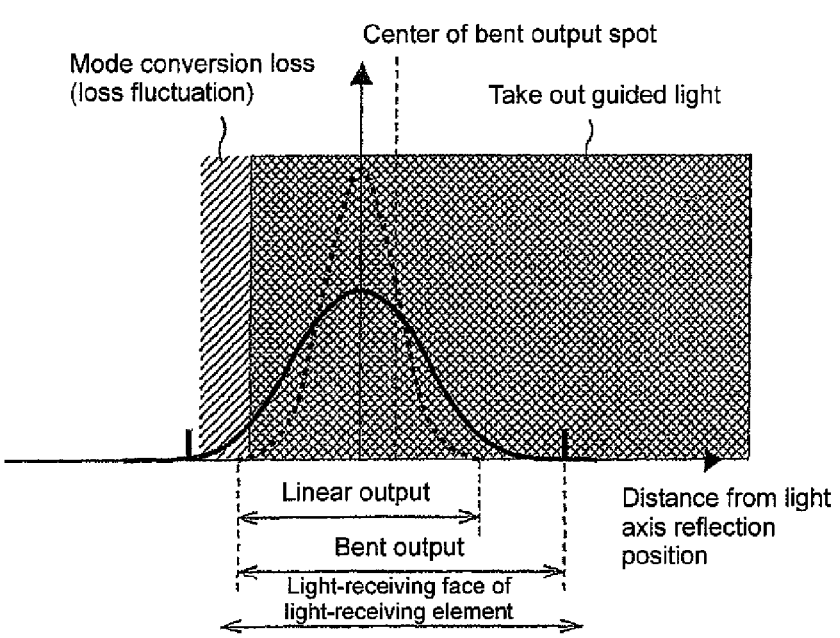

As a result, the light intensity distribution of signal light rays on the light-receiving face of the optical cable module 1 is formed into one as shown in FIG. 1(b). Moreover, the profile (hereinafter, referred to as light-receiving profile) of signal light rays on the light-receiving face of the optical cable module 1 is schematically represented as one shown in FIG. 3. When the light-receiving profile in the case of no bending in the optical waveguide 10 is compared with the light-receiving profile with a bending in the optical waveguide 10, the light-receiving profile with a bending in the optical waveguide 10 becomes wider in a manner so as to correspond to a wider angle distribution of signal light. For this reason, in the case when, assuming that only the light-receiving profile in the case of no bending in the optical waveguide 10 exists, the light-receiving face in the light-receiving element 11 is formed so as to cover an area that includes this light-receiving profile, the light-receiving face fails to deal with the expanded light-receiving profile in the case when there is a bending in the optical waveguide 10, resulting in a spot-size mismatching loss.

In contrast, in the case when there is a bending in the optical waveguide 10, the light-receiving profile is subjected to a generation of a comparatively large area to be cut off by the optical path conversion mirror. When the light-receiving profile without a bending and the light-receiving profile with a bending are compared with each other, the light-receiving profile with a bending becomes wider; however, even the light-receiving profile with a bending is not expanded toward the side on which the area is cut off by the optical path conversion mirror.

For this reason, when the light-receiving face of the light-receiving element is expanded so as to include the light-receiving profile with a bending in the optical waveguide, with the center of the light-receiving element being made coincident with the reflection center of the light axis as in the case of the prior art, the light-receiving element is expanded to the area in which the signal light rays are cut off by the optical path conversion mirror. This causes difficulties in miniaturizing the optical cable module, and also causes a reduction in the response speed of the light-receiving element.

In contrast, in the optical cable module 1 according to the present embodiment 1, the center of the light-receiving element 11 is placed to deviate from the light-axis reflection position toward the end portion side of the optical waveguide 10, that is, toward the side opposite to the side on which the cutting off of the signal light rays is caused by the optical path conversion mirror. With this arrangement, the profile of the light-receiving element 11 is reduced so as not to contain the area in which signal light rays are cut off by the optical path conversion mirror, and the light-receiving element 11 is consequently allowed to receive both of the light-receiving profile without a bending in the optical waveguide and the light-receiving profile with a bending in the optical waveguide, without causing any spot-size mismatching loss.

Figure 3:
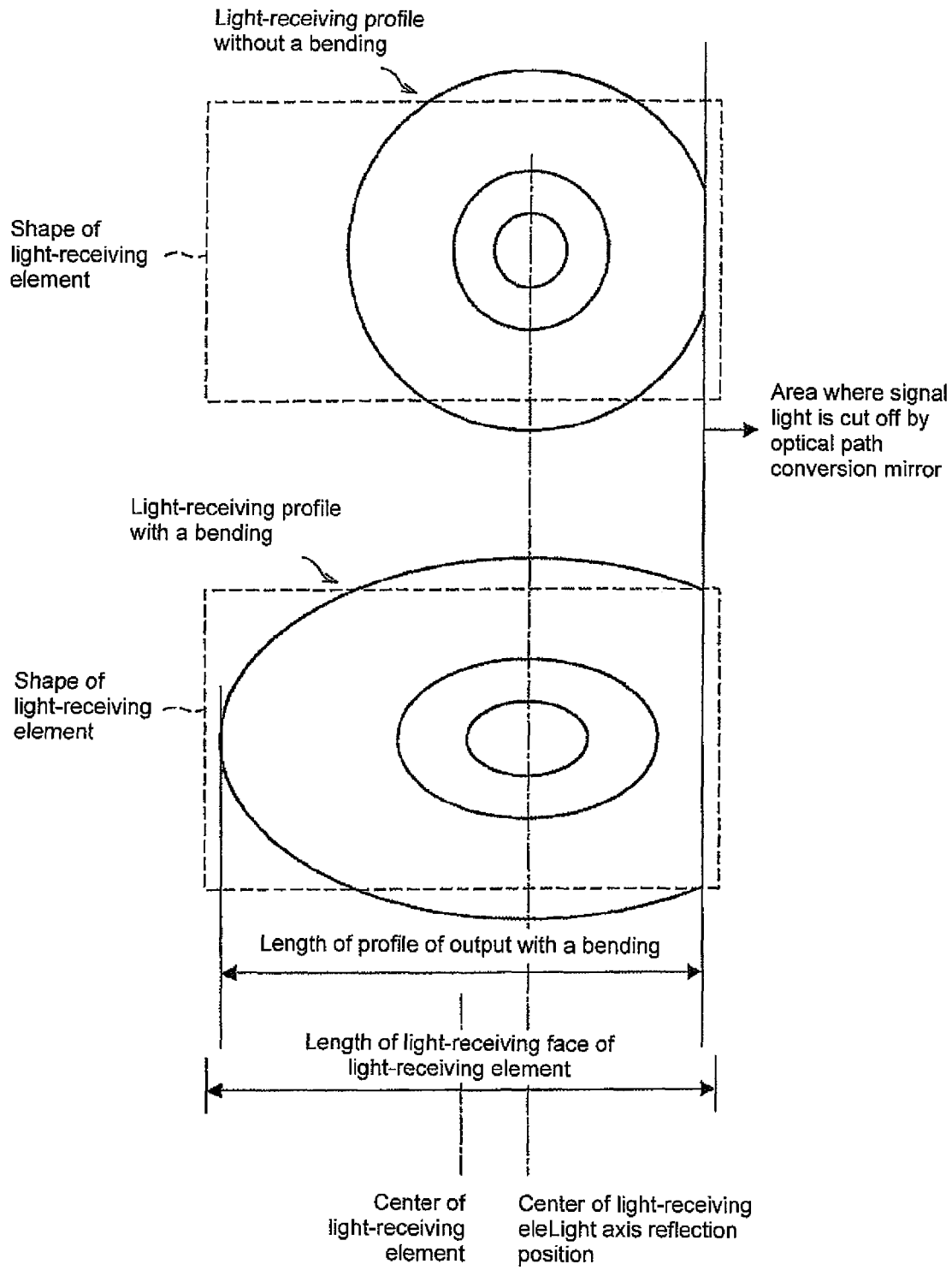
FIG. 3 is a diagram that schematically shows profiles of signal light rays on the light-receiving face of the optical cable module in both of the states where there is a bending in the optical waveguide and where there is no bending in the optical waveguide.

Here, by making the center of the light-receiving element 11 coincident with the center of the light-receiving profile (bending output spot) with a bending, it is possible to obtain the above-mentioned effect by using the minimum light-receiving area. However, the center of the light-receiving element 11 is not necessarily required to be made completely coincident with the center of the light-receiving profile with a bending. Although the above description has simply described the light-receiving profile with a bending, the degree of expansion of the light-receiving profile differs depending on the degree of the bending. For this reason, among the application modes of the optical cable module 1, the light-receiving area of the light-receiving element 11 can be set in accordance with the case having the widest light-receiving profile. Moreover, with respect to the shape of the light-receiving element, a shape in which the longitudinal axis is set in the expanding direction of output light rays upon having a bending in the optical waveguide is preferably used, and although not particularly limited, various shapes, such as a rectangular shape, an elliptical shape and a diamond shape, may be used (for example, a light-receiving element having a rectangular shape is shown in FIG. 3).

Figure 4A:
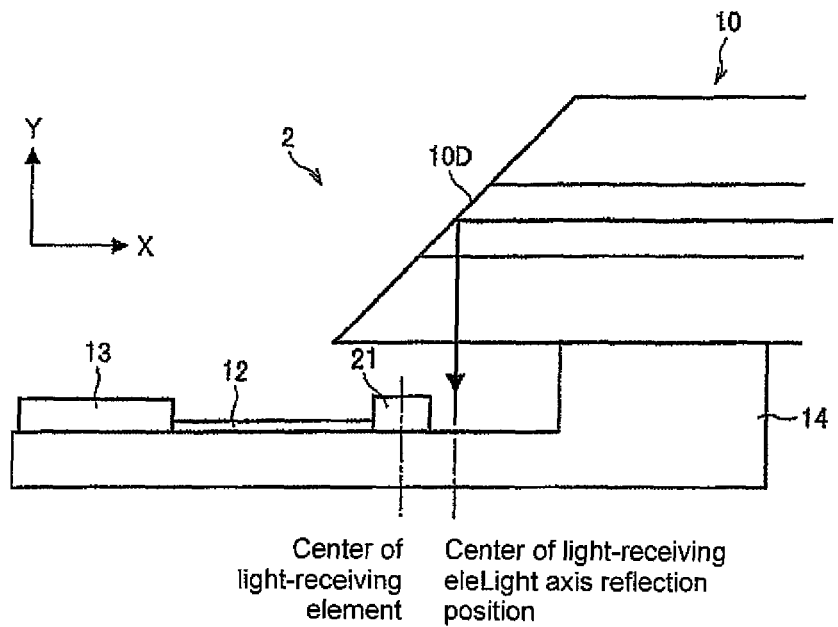
FIGS. 4(a) and 4(b) show another embodiment of the present invention.
Figure 4B:
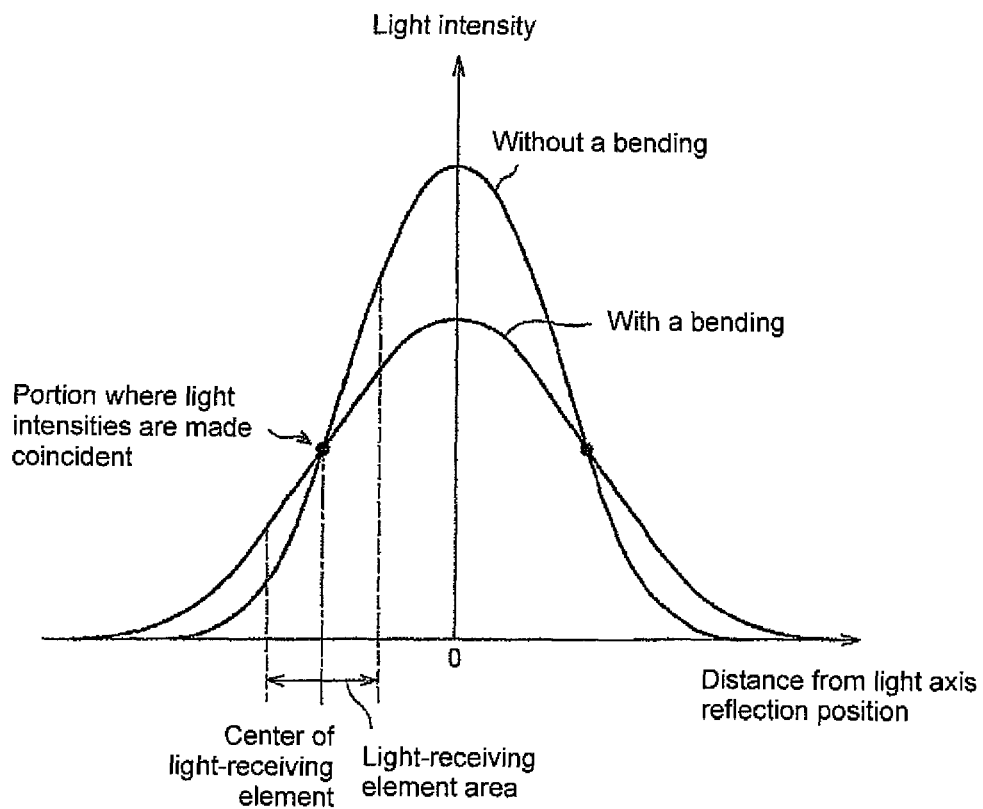

Next, FIGS. 4(a) and 4(b) show a modified example of the optical cable module according to the present embodiment 1. Since an optical cable module 2 shown in FIG. 4(a) has a structure similar to that of the optical cable module 1 shown in FIG. 1(a), those members that are the same as those of the optical cable module 1 are indicated by common reference numbers, and the detailed descriptions thereof will be omitted.

The optical cable module 2 shown in FIG. 4(*a*) differs from the optical cable module 1 shown in FIG. 1(*a*) in that a light-receiving element 21 is installed therein in place of the light-receiving element 11. The light-receiving element 21 is placed with its center gap from the light-axis reflection position. Here, the following description will discuss the layout of the light-receiving element 21 in detail.

First, FIG. 4(*b*) shows light intensity distributions of signal light rays on the light-receiving face in both of the states where there is a bending in the optical waveguide 10 and where there is no bending in the optical waveguide 10. In FIG. 4(*b*), the axis of abscissa indicates the distance from the light-axis reflection position and the axis of ordinate indicates the light intensity.

As clearly seen from FIG. 4(*b*), in the light intensity distribution (Gaussian distribution or Lambertian distribution) of signal light with no bending in the optical waveguide 10, the expansion of the signal light is small, with a light intensity in the center portion (peak value) being set to a high level. In contrast, in the light intensity distribution of signal light with a bending in the optical waveguide 10, the expansion of the signal light is large, with a light intensity in the center portion (peak value) being set to a low level.

In this case, between the light intensity distribution of signal light with no bending and the light intensity distribution of signal light with a bending, there is a position at which the light intensities are made coincident with each other. In the optical cable module 2, the light-receiving element 21 is disposed so that the center of the light-receiving element 21 is virtually made coincident with the position at which the light intensities are made coincident with each other. Thus, the quantity of received light by the light-receiving element 21 is made virtually uniform regardless of the presence or absence of a bending in the optical waveguide so that the light-receiving element 21 makes it possible to prevent generation of a spot-size mismatching loss.

In the light-receiving element 21, as the light-receiving area becomes smaller, the quantity of received light can be obtained more uniformly regardless of the presence or absence of a bending. Here, in the case when the light-receiving area of the light-receiving element 21 is made too small, the quantity of received signal light is lowered; therefore, the light-receiving area of the light-receiving element 21 is preferably determined by also taking into consideration the quantity of received light to be required. Moreover, the position at which the light intensities are made coincident and the center of the light-receiving element 21 are not necessarily required to be made completely coincident with each other, and by allowing these to slightly deviate from each other, it sometimes becomes possible to obtain the quantity of received light more uniformly in both of the cases where there is a bending and where there is no bending.

Embodiment 2

Referring to Drawings, the following description will discuss another embodiment of the present invention. First, referring to FIGS. 5(*a*) and 5(*b*), one structural example of an optical cable module according to embodiment 2 will be described.

Figure 5A:
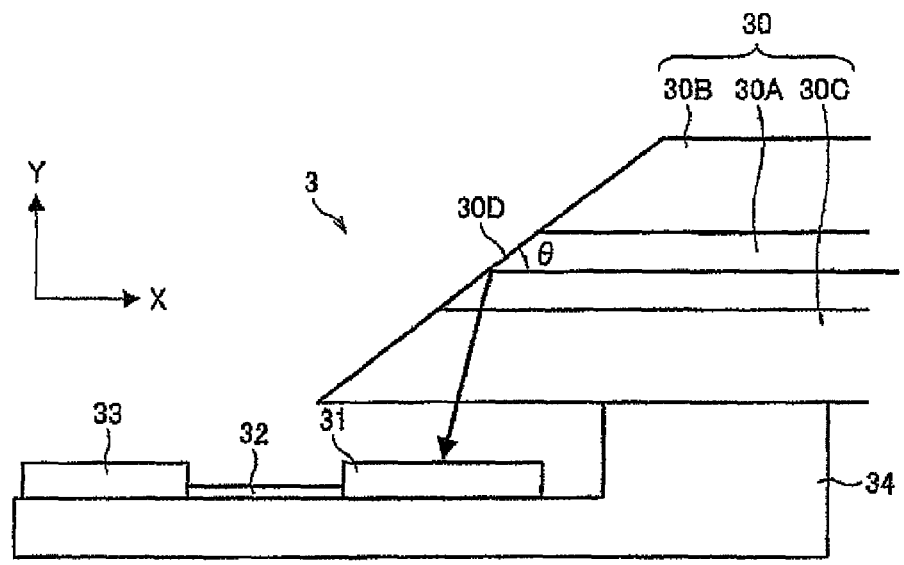
FIGS. 5(a) and 5(b) show still another embodiment of the present invention.
Figure 5B:
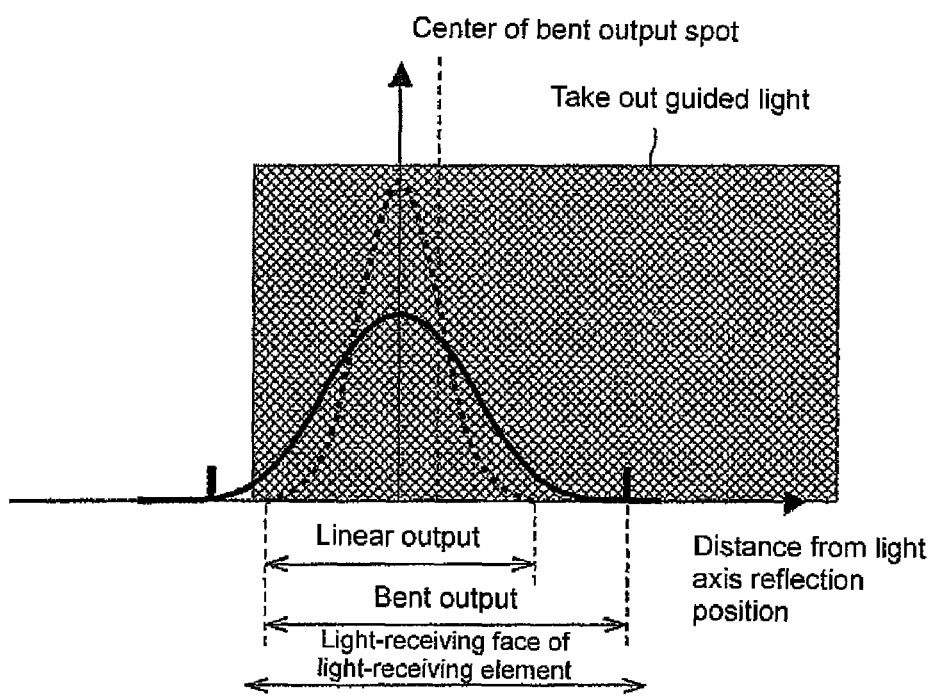

An optical cable module 3 shown in FIG. 5(*a*) is mainly configured by an optical waveguide 30, a light-receiving element 31 and a supporting substrate 34 on its end portion on the light-releasing side. The end portion of the optical waveguide 30 is secured onto the supporting substrate 34 by a bonding process or the like, and the end portion of the optical waveguide 30 and the light-receiving element 31 are secured in their relative positional relationship. Moreover, the optical cable module 3 may be provided with an electric wire 32 and an electrical connection unit 33 so as to easily take out an electric signal outputted by the light-receiving element 31.

Here, in the same manner as in the optical waveguide 30 of the optical cable module 1, the optical waveguide 30 of the optical cable module 3 is configured by a core 30A, an upper clad layer 30B and a lower clad layer 30C. Moreover, the end face of the optical waveguide 30 is not made perpendicular to the light axis (X-axis), and is diagonally cut off so as to form an optical path conversion mirror 30D. More specifically, the end face of the optical waveguide 30 is made perpendicular to the XY plane, and inclined so as to make an angle $\theta$ ($\theta<90°$) relative to the X-axis. Thus, a signal light ray, transmitted through the core 30A, is reflected by the optical path conversion mirror 30D, and changed in its proceeding direction to be released toward the light-receiving element 31.

Here, the optical waveguide 30 differs from the optical waveguide 10 in that the inclination angle $\theta$ of the optical path conversion mirror 30D is set by taking into consideration the quantity of cut-off signal light in the optical path conversion mirror 30D.

That is, as also described in embodiment 1, when the optical waveguide 30 is bent with the result that the angle distribution of signal light to be made incident on the optical path conversion mirror 30D is expanded, light rays that are made incident on the optical path conversion mirror 30D with a deep angle increase in comparison with the state in which the optical waveguide 30 is not bent. For this reason, the optical cable module 3 according to embodiment 2 is characterized in that the inclination angle $\theta$ of the optical path conversion mirror 30D is made smaller so that the quantity of signal light to be cut off by the optical path conversion mirror 30D is reduced.

In the optical cable module 3 shown in FIG. 5(*a*), the relationship between a light intensity distribution of a signal light ray on a light-receiving face of the light-receiving element 31 and a guided light distribution area taken out by the optical path conversion mirror 30D is given by one shown in FIG. 5(*b*). That is, as clearly seen from FIG. 5(*b*), in the optical cable module 3, in both of the cases where there is a bending in the optical waveguide 30 and where there is no bending therein, the angle made by the optical path conversion mirror 30D and the light axis of the core 30A can be set so as to allow the light-receiving element 31 to receive almost all the signal light rays transmitted through the optical waveguide 30.

Figure 6:
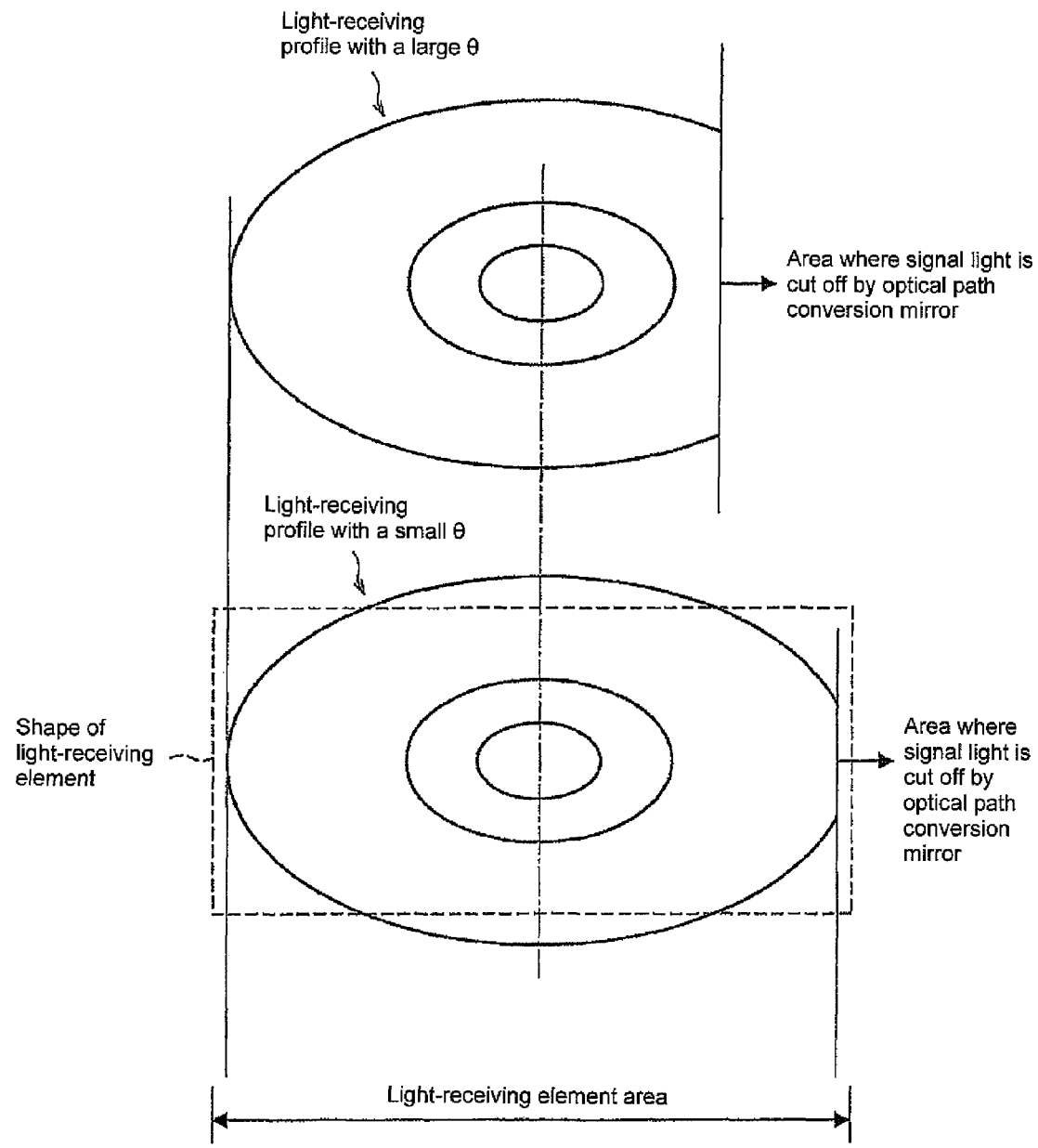
FIG. 6 is a diagram that schematically shows a difference between light-receiving profiles caused by different inclination angles of the optical path conversion mirror, in a state where there is a bending in the optical waveguide.

In the case when there is a bending in the optical waveguide, FIG. 6 schematically shows a difference in light-receiving profiles due to different inclination angles $\theta$ of the optical path conversion mirror.

In FIG. 6, in the case when the inclination angle $\theta$ of the optical path conversion mirror (for example, $\theta=45°$) is large, the light-receiving profile has a comparatively large area where the signal light is cut off by the optical path conversion mirror. In contrast, in the case when the inclination angle $\theta$ of the optical path conversion mirror (for example, $\theta=35°$) is small, the light-receiving profile has a smaller area where the signal light is cut off by the optical path conversion mirror.

In this manner, even when the angle distribution of signal light is expanded due to a bending occurring in the optical waveguide, the quantity of signal light to be cut off by the optical path conversion mirror becomes smaller if the inclination angle $\theta$ of the optical path conversion mirror is set to a small value. That is, by making the inclination angle θ of the optical path conversion mirror smaller, the optical path conversion loss can be reduced, and consequently, the quantity of received light can be uniformed regardless of the presence or absence of a bending in the optical waveguide. Here, in the optical cable module 3, the inclination angle θ of the optical path conversion mirror 30D is preferably set in a range from 37 to 43°.

As the inclination angle θ of the optical path conversion mirror becomes smaller, the spot size of output light becomes larger, and in an attempt to receive the resulting light, a large light-receiving element is required. As a result, a problem arises in which the communication speed becomes slower. In contrast, as the inclination angle θ of the optical path conversion mirror becomes larger, the area where signal light is cut off by the optical path conversion mirror becomes larger, resulting in a problem of an increase in the optical path conversion loss.

Figure 7:
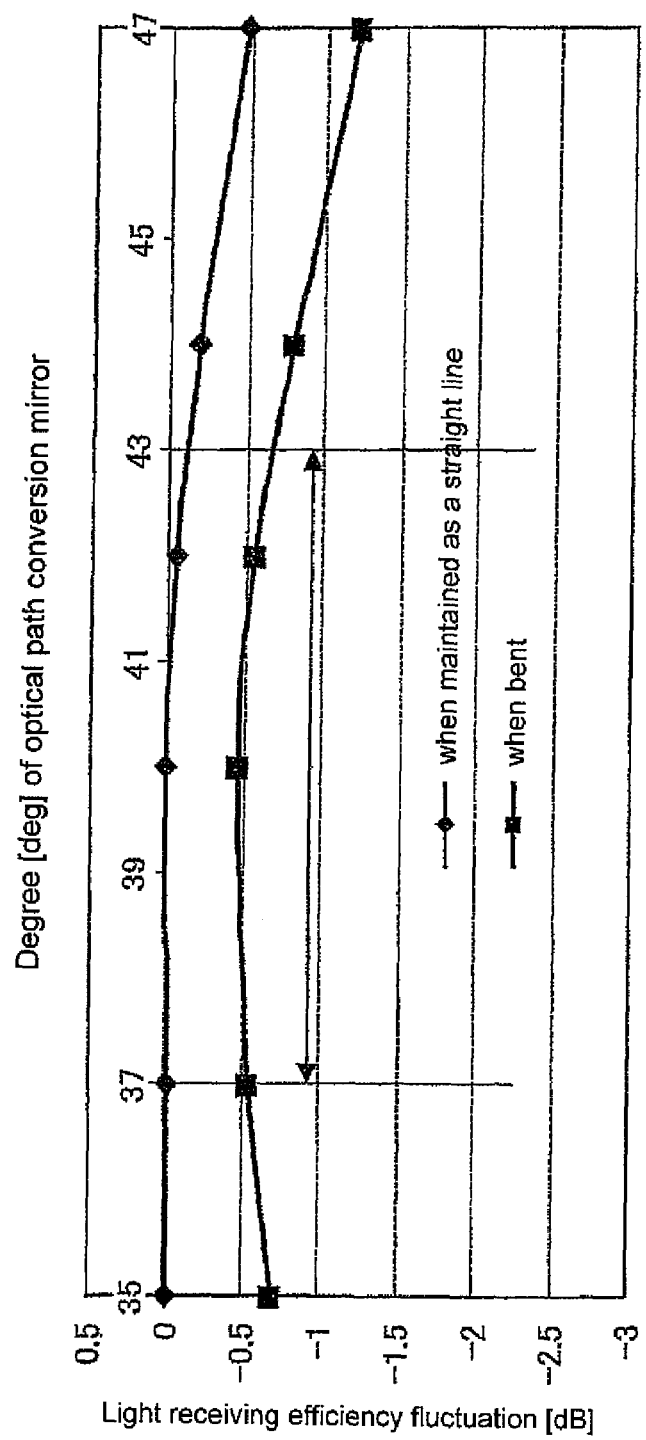
FIG. 7 is a graph that shows the relationship between fluctuations in light-receiving efficiency and a inclination angle θ of an optical path conversion mirror in both of the states where there is a bending and where there is no bending in the optical waveguide.

FIG. 7 shows the relationship between fluctuations in light-receiving efficiency and a inclination angle θ (mirror angle) of an optical path conversion mirror in both of the states where there is no bending (with a straight line) and where there is a bending (with a bent line) in the optical waveguide. In an attempt to suppress a difference in fluctuations of the light-receiving efficiency as small as possible between the states where there is no bending in the optical waveguide and where there is a bending therein, the inclination angle θ of the optical path conversion mirror is preferably set in a range from 37 to 43° from a viewpoint of a permissible range in such a level as not to give adverse effects to a receiving circuit.

Moreover, in the optical cable module 3, the area where signal light is cut off by the optical path conversion mirror is made smaller. For this reason, the light-receiving element 31 may be arranged so that its center is made coincident with the light axis reflection position (assuming that there is light that passes through the center of the cross section of the light axis of the core, a position at which, after having been reflected by the optical path conversion mirror, this light reaches the light-receiving face). However, even a slight area where signal light is cut off by the optical path conversion mirror is generated, the center of the light-receiving element 31 may be placed with a gap from the light axis reflection position, as shown in embodiment 1.

Figure 8A:
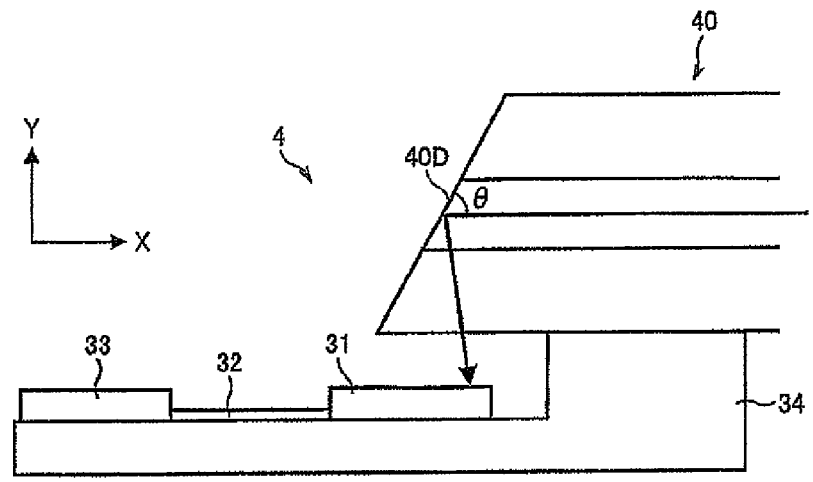
FIGS. 8(a) and 8(b) show still another embodiment of the present invention.
Figure 8B:
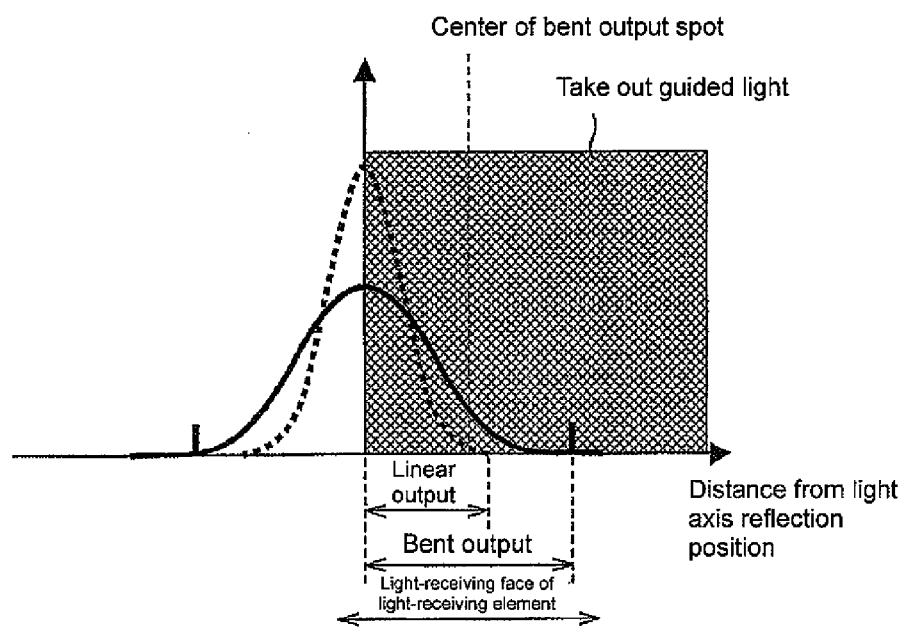

FIGS. 8(*a*) and 8(*b*) show modified example of the optical cable module according to the present embodiment 2. Since the optical cable module 4 shown in FIG. 8(*a*) has a structure similar to that of the optical cable module 3 shown in FIG. 5(*a*), those members that are the same as those of the optical cable module 3 are indicated by common reference numbers, and the detailed descriptions thereof will be omitted.

The optical cable module 4 shown in FIG. 8(*a*) differs from the optical cable module 4 shown in FIG. 5(*a*) in that an optical waveguide 40 is installed in place of the optical waveguide 30. Here, the optical waveguide 40 is characterized in that, by making the inclination angle θ of the optical path conversion mirror 40D larger, the quantity of signal light to be cut off by the optical path conversion mirror 40D is increased.

In the optical cable module 4 shown in FIG. 8(*a*), a relationship between a light intensity distribution of signal light on the light-receiving face of the light-receiving element 31 and a guided light distribution area taken out by the optical path conversion mirror 40D is given by one shown in FIG. 8(*b*). That is, as clearly seen from FIG. 8(*b*), in the optical cable module 4, in both of cases where there is a bending in the optical waveguide 40 and where there is no bending therein, the angle made by the optical path conversion mirror 40D and the light axis of the core 40A can be set so as to allow the light-receiving element 31 to receive about half the signal light rays transmitted through the optical waveguide 40. This arrangement makes it possible to further miniaturize the light-receiving element, and consequently to make the communication speed faster.

Here, the following description will discuss in detail reasons why, in the optical waveguide 40, the quantity of signal light to be cut off by the optical path conversion mirror 40D is increased.

Figure 9:
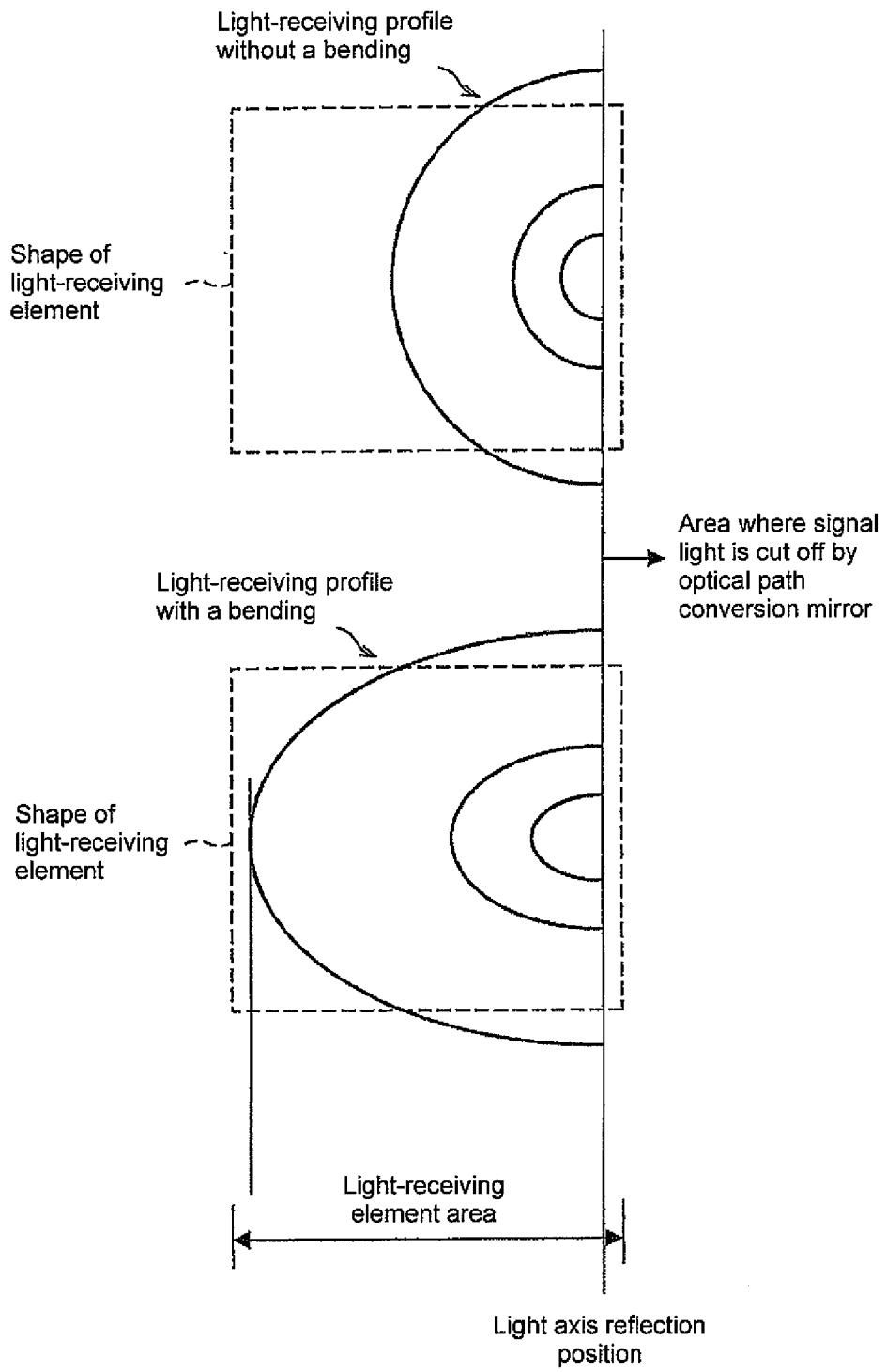
FIG. 9 is a diagram that shows light-receiving profiles in both of the states where there is a bending in the optical waveguide and where there is no bending in the optical waveguide.

First, FIG. 9 schematically shows light-receiving profiles in both of the states where there is no bending in the optical waveguide 40 and where there is a bending in the optical waveguide 40. In FIG. 9, the point to which attention should be drawn is that the area where signal light is cut off by the optical path conversion mirror 40D has the light axis reflection position as its border. In this case, regardless of the presence or absence of a bending in the optical waveguide 40, about ½ of signal light that has been transmitted through the optical waveguide 40 is cut off by the optical path conversion mirror 40D.

That is, in the optical cable module 4, the inclination angle θ of the optical path conversion mirror 40D is set so that the border of an area where signal light is cut off by the optical path conversion mirror 40D is made virtually coincident with the light axis reflection position. With this arrangement, the fluctuations in the quantity of signal light to be cut off by the optical path conversion mirror 40D are eliminated (or reduced) so that the quantity of received light can be uniformed regardless of the presence or absence of a bending in the optical waveguide.

In an attempt to allow the border of an area where signal light is cut off by the optical path conversion mirror 40D to be made coincident with the light axis reflection position, the inclination angle θ of the optical path conversion mirror 40D is preferably made equal to the critical angle of the optical path conversion mirror 40D. When the refractive index of a material to be normally used as the optical waveguide is taken into consideration, the inclination angle θ of the optical path conversion mirror 40D is desirably set in a range from 50 to 60°.

Moreover, in the same manner as in embodiment 1, the light-receiving element 31 in the optical cable module 4 is designed so that the center of a light-receiving profile with a bending in the optical waveguide 40 and the center of the light-receiving element 31 are made coincident with each other; thus, it becomes possible to receive signal light rays by using a minimum light-receiving area, without causing any spot-size mismatching loss.

Figure 10:
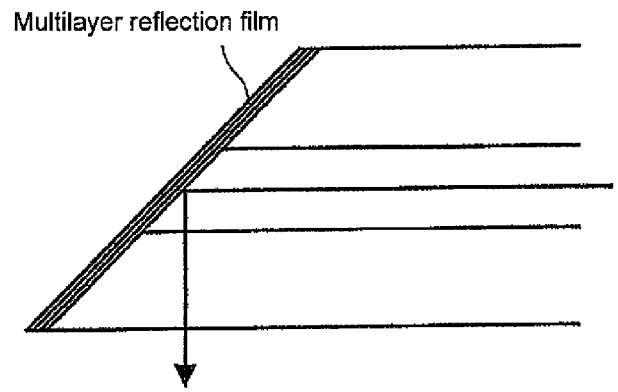
FIG. 10 is a cross-sectional view that shows a structural example of an optical waveguide in which an optical path conversion mirror is formed as a multilayer reflection film.

Moreover, in the optical cable modules 3 and 4 shown in FIGS. 5(*a*) and 8(*a*), by properly setting the inclination angle θ of the optical path conversion mirror, the amount of loss of signal light rays in the optical path conversion mirror is controlled. However, in addition to this, as shown in FIG. 10, by preparing the optical path conversion mirror of the optical waveguide as a multilayer reflection film, it is possible to also control the amount of loss. The multilayer reflection film is a film in which two or more kinds of thin films having different refractive indexes are laminated into a multilayer, and by adjusting the thin films to be combined, high-order-mode components can be lost by appropriate amounts so that the light-receiving profiles as shown in FIG. 6 and FIG. 9 can be obtained on demand.

Figure 11A:
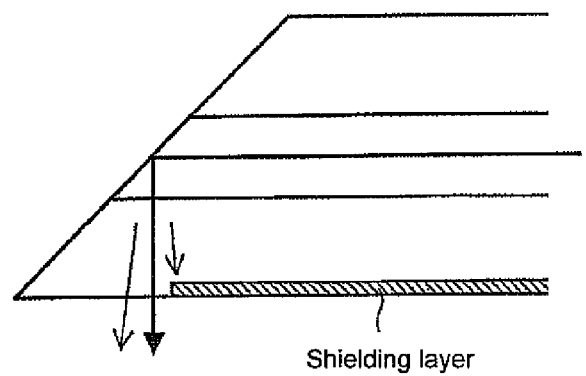
FIG. 11(a) is a cross-sectional view that shows a structural example of an optical waveguide in which a light-shielding layer is formed on the light-releasing side of the optical path conversion mirror.
Figure 11B:
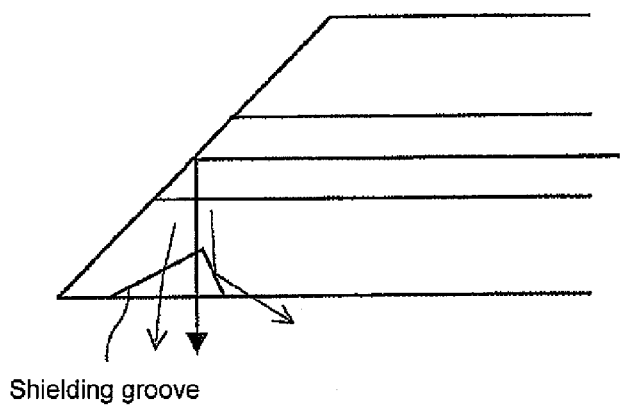
FIG. 11(b) is a cross-sectional view that shows a structural example of an optical waveguide in which a light-shielding groove is formed on the light-releasing side of the optical path conversion mirror.
Figure 12:
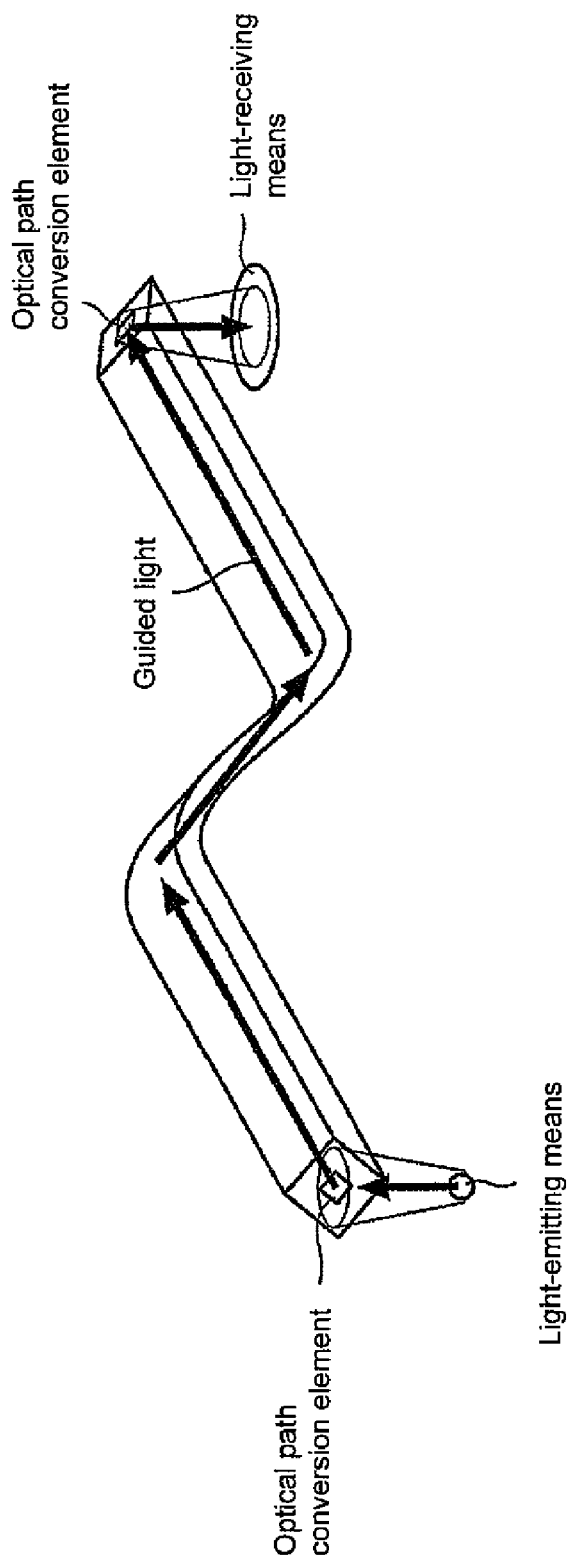
FIG. 12 is a perspective view that shows an optical waveguide module.
Figure 13:
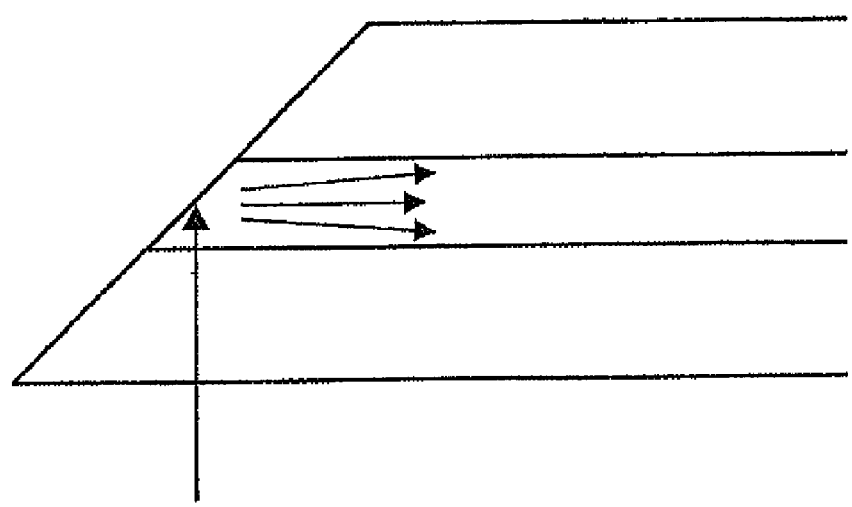
FIG. 13 is a diagram that shows an angle distribution in a signal light ray that is made incident on a core of the optical waveguide.
Figure 14A:
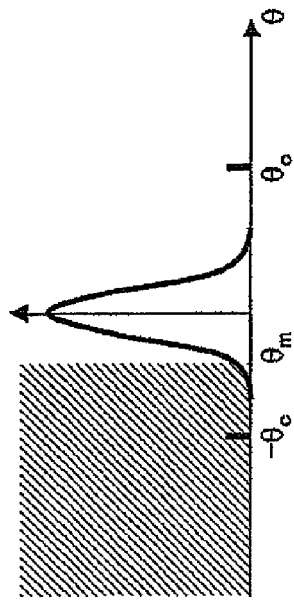
FIG. 14(a) is a side view that shows an optical waveguide in a state where there is no bending.
Figure 14B:
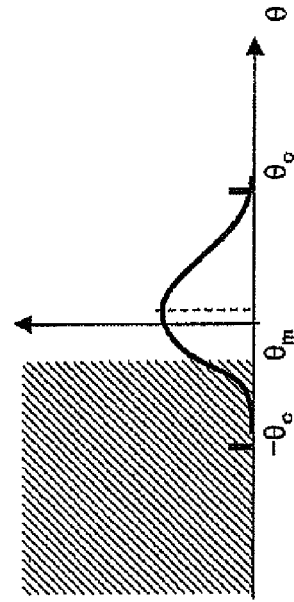
FIG. 14(b) is a diagram that shows a light intensity distribution of a signal light ray on a light-receiving face in the optical waveguide shown in FIG. 14(a).
Figure 14C:
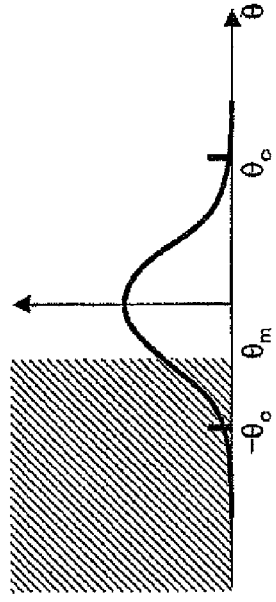
FIG. 14(c) is a side view that shows an optical waveguide in a state where there is a bending close to an output end.
Figure 14D:
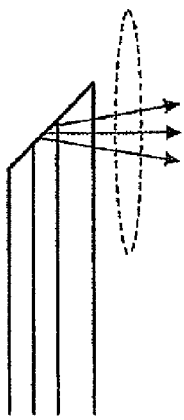
FIG. 14(d) is a diagram that shows a light intensity distribution of a signal light ray on a light-receiving face in the optical waveguide shown in FIG. 14(c).
Figure 14E:
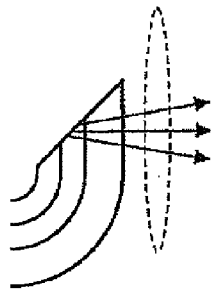
FIG. 14(e) is a side view that shows an optical waveguide in a state where there is a bending that is apart from the output end to a certain degree.
Figure 14F:
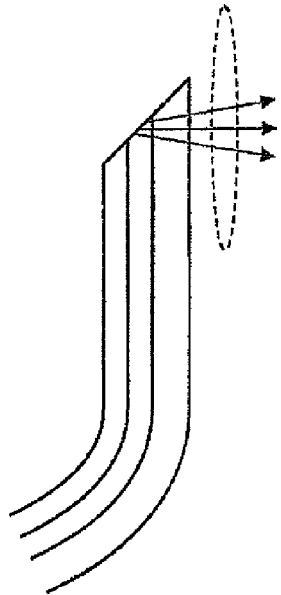
FIG. 14(f) is a diagram that shows a light intensity distribution of a signal light ray on a light-receiving face in the optical waveguide shown in FIG. 14(e).
Figure 15:
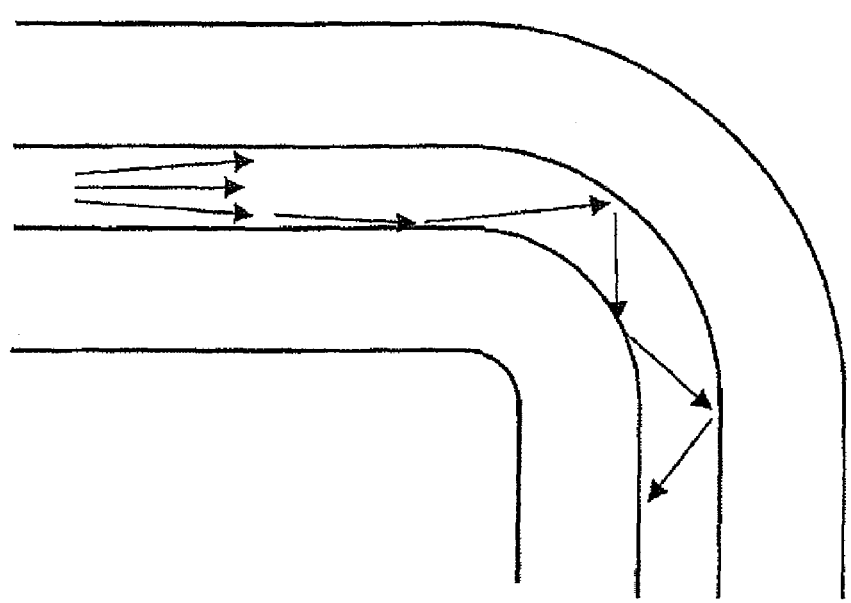
FIG. 15 is a diagram that shows an angle change in a signal light ray in a state where there is a bending in the optical path of the optical waveguide.

Moreover, as shown in FIGS. 11(*a*) and 11(*b*), by installing a shielding layer (reflection layer, absorbing layer or diffusion layer) or a shielding groove on the bottom portion (on the light-releasing side of the optical path conversion mirror) of the lower clad layer of the optical waveguide, it is possible to desirably control the loss of signal light, and consequently to obtain light-receiving profiles as shown in FIGS. 6 and 9 on demand.

As described above, the optical cable module according to the present embodiments 1 and 2 makes it possible to suppress fluctuations in quantity of signal light due to a shape change of the optical waveguide of the optical cable module. Therefore, the optical cable module can be desirably applied as a flexible wire used for transmitting data through substrates in an apparatus. For example, the optical cable module may be used as a flexible wire in a hinge portion of a portable telephone. Not limited to this, the optical cable module of the present invention is of course applicable to many fields, such as notebook personal computers, PDAs, liquid crystal TVs, desktop monitors, printers, electric appliances for automobiles, servers, rooters, testers, and other household apparatuses and general-use apparatuses.

As described above, the optical cable module of the present invention is provided with a core, a clad layer that surrounds the core around the light axis of the core, an optical waveguide in which an optical path conversion mirror that converts the optical path of signal light by light reflection on its end face is formed on at least one end portion thereof, and a light-receiving element that has a fixed positional relationship relative to the end portion of the optical waveguide, and the center of the light-receiving element is placed with a gap from a first position at which light transmitted through the center of the cross section of the light axis of the core is reflected by the optical path conversion mirror to reach the light-receiving face.

In the case when there is a bending in the optical waveguide, the angle distribution of signal light that proceeds through the optical waveguide is expanded, with the result that an area where the signal light is cut off by the optical path conversion mirror is generated as a comparatively large area. For this reason, when the light-receiving profile without a bending is compared with the light-receiving profile with a bending, the light-receiving profile with a bending becomes larger; however, even the light-receiving profile with a bending is prevented from expanding toward the side with an area having a cut-off portion by the optical path conversion mirror.

For this reason, in the case when the light-receiving face of the light-receiving element is expanded so as to include the light-receiving profile with a bending in the optical waveguide, with the center of the light-receiving element being made coincident with the light-axis reflection center as in the case of conventional devices, the light-receiving element expands up to the area where the signal light is cut off by the optical path conversion mirror. This causes difficulties in miniaturizing the optical cable module, and also causes a reduction in the response speed of the light-receiving element.

In contrast, in accordance with the above-mentioned arrangement, the center of the light-receiving element is placed with a gap from the first position (light axis reflection position) at which light transmitted through the center of the cross section of the light axis of the core is reflected by the optical path conversion mirror to reach the light-receiving face. With this arrangement, the profile of the light-receiving element is reduced as much as possible so as not to contain the area in which signal light is cut off by the optical path conversion mirror, and the light-receiving element is consequently allowed to receive both of the light-receiving profile without bending in the optical waveguide and the light-receiving profile with a bending in the optical waveguide, without causing any spot-size mismatching loss.

Moreover, in the optical cable module, the light-receiving element is preferably allowed to deviate from the first position in the expanding direction of output light in the case when there is a bending in the optical waveguide.

Moreover, in the optical cable module, the center of the light-receiving element is preferably arranged so as to be made coincident with the center of a spot of the output light in the case when there is a bending in the optical waveguide.

In accordance with the above-mentioned structure, by making the center of the light-receiving element coincident with the center of the receiving light profile in the case when there is a bending in the optical waveguide, it becomes possible to obtain the above-mentioned effects by utilizing the minimum light-receiving area.

Moreover, in the optical cable module, the center of the light-receiving element is preferably placed at a position where the light intensities of the output light with no bending in the optical waveguide and the output light with a bending in the optical waveguide are made virtually equal to each other.

In the light intensity distribution of signal light with no bending in the optical waveguide, the expansion of the signal light is small, with the light intensity in the center being higher. In contrast, in the light intensity distribution of signal light with a bending in the optical waveguide, the expansion of the signal light is large, with the light intensity in the center being lower.

In this case, between the light intensity distribution of signal light with no bending and the light intensity distribution of signal light with a bending, there is a portion where the light intensities are made coincident with each other. In accordance with the above-mentioned structure, the light-receiving element is placed so that the center of the light-receiving element is made virtually coincident with the portion where the light intensities are made coincident with each other. With this arrangement, the quantity of received light by the light-receiving element is made virtually uniform regardless of the presence or absence of a bending in the optical waveguide so that the light-receiving element is allowed to prevent generation of a spot-size mismatching loss.

Moreover, another optical cable module according to the present invention is provided with a core, a clad layer that surrounds the core around the light axis of the core, an optical waveguide in which an optical path conversion mirror that converts the optical path of signal light by light reflection on its end face is formed on at least one end portion thereof, and a light-receiving element that has a fixed positional relationship relative to the end portion of the optical waveguide, and the optical path conversion mirror is designed so that the output light from the optical waveguide is made virtually uniform regardless of the presence or absence of a bending in the optical waveguide.

In accordance with this structure, since the output light from the optical waveguide is made virtually uniform regardless of the presence or absence of a bending in the optical waveguide, the quantity of received light in the light-receiving element can be made uniform.

Moreover, in the optical cable module, the optical path conversion mirror may be designed so that almost all the signal light transmitted through the optical waveguide can be outputted toward the light-receiving element.

Furthermore, in the optical cable module, the optical path conversion mirror is formed by an end face produced by diagonally cutting off the end portion of the optical waveguide, and the angle made by the optical path conversion mirror and the light axis of the core is preferably set in a range from 37 to 43°.

In accordance with this structure, even when the angle distribution of signal light is expanded by a bending occurred in the optical waveguide, the quantity of received light in the light-receiving element can be uniformed by reducing the optical path conversion loss, as well as by outputting almost all the signal light transmitted through the optical waveguide toward the light-receiving element.

In order to output almost all the signal light transmitted through the optical waveguide toward the light-receiving element, by setting the inclination angle of the optical path conversion mirror to a small angle, for example, in a range from 37 to 43°, the quantity of signal light to be cut off by the optical path conversion mirror is made smaller so that the optical path conversion loss is reduced.

Moreover, in the optical cable module, the optical path conversion mirror may be designed so that virtually half of the signal light transmitted through the optical waveguide is outputted toward the light-receiving element.

Furthermore, in the above-mentioned optical cable module, the optical path conversion mirror is formed by an end face produced by diagonally cutting off the end portion of the optical waveguide, and the angle made by the optical path conversion mirror and the light axis of the core is preferably set in a range from 50 to 60°.

In accordance with this structure, even when the angle distribution of signal light is expanded by a bending occurred in the optical waveguide, the quantity of received light in the light-receiving element can be uniformed by outputting virtually half of the signal light transmitted through the optical waveguide toward the light-receiving element.

In order to output virtually half of the signal light transmitted through the optical waveguide toward the light-receiving element, by setting the inclination angle of the optical path conversion mirror to a large angle, for example, in a range from 50 to 60°, the quantity of signal light to be cut off by the optical path conversion mirror is made larger so that the optical path conversion loss is increased.

The invention claimed is:

1. An optical cable module comprising:
a core;
a clad layer that surrounds the core around the light axis of the core;
an optical waveguide in which an optical path conversion mirror that converts an optical path of signal light by light reflection on the end face thereof is formed on at least one end portion thereof; and
a light-receiving element that has a fixed positional relationship relative to the end portion of the optical waveguide,
wherein the optical path conversion mirror reflects light towards a light receiving face of the light-receiving element,
wherein the optical cable module comprises a first position that is a position in a plane of the light receiving face directly below where light is incident on the optical path conversion mirror after being transmitted through the center of the cross section of the light axis of the core,
wherein a geometric center of the light-receiving element is disposed at a position offset from the first position, and
wherein the light-receiving element is positioned offset from the first position in an expanding direction, which is a direction in which output light expands when the optical waveguide is bent, a distance that, when the optical waveguide is bent, a border of an area where signal light is cut off by the optical path conversion mirror is proximate to an end of the light-receiving face of the light-receiving element.

2. An optical cable module comprising:
a core;
a clad layer that surrounds the core around the light axis of the core;
an optical waveguide in which an optical path conversion mirror that converts an optical path of signal light by light reflection on the end face thereof is formed on at least one end portion thereof; and
a light-receiving element that has a fixed positional relationship relative to the end portion of the optical waveguide,
wherein the optical path conversion mirror reflects light towards a light receiving face of the light-receiving element,
wherein the optical cable module comprises a first position that is a position in a plane of the light receiving face directly below where light is incident on the optical path conversion mirror after being transmitted through the center of the cross section of the light axis of the core,
wherein a geometric center of the light-receiving element is disposed at a position offset from the first position, and
the center of the light-receiving element is placed so as to be made virtually coincident with a spot center of output light when there is a bending in the optical waveguide.

3. An optical cable module comprising:
a core;
a clad layer that surrounds the core around the light axis of the core;
an optical waveguide in which an optical path conversion mirror that converts an optical path of signal light by light reflection on the end face thereof is formed on at least one end portion thereof; and
a light-receiving element that has a fixed positional relationship relative to the end portion of the optical waveguide,
wherein the optical path conversion mirror reflects light towards a light receiving face of the light-receiving element,
wherein the optical cable module comprises a first position that is a position in a plane of the light receiving face directly below where light is incident on the optical path conversion mirror after being transmitted through the center of the cross section of the light axis of the core,
wherein a geometric center of the light-receiving element is disposed at a position offset from the first position, and
the center of the light-receiving element is placed at a position where light intensities of output light when there is no bending in the optical waveguide and output light when there is a bending in the optical waveguide are made virtually equal to each other.

4. The optical cable module according to claim 1, wherein the optical path conversion mirror is made of an end face formed by diagonally cutting the end portion of the optical waveguide, with an angle, made by the optical path conversion mirror and the light axis of the core, being set in a range from 37 to 43°.

5. The optical cable module according to claim 1, wherein the optical conversion mirror is made of an end face formed by diagonally cutting the end portion of the optical waveguide, with an angle, made by the optical path conversion mirror and the light axis of the core, being set in a range from 50 to 60°.

6. The optical cable module according to claim 1, wherein the light-receiving element has a shape with a longitudinal axis in an expanding direction of output light when there is a bending in the optical waveguide.

7. An apparatus comprising: the optical cable module according to claim 1.

8. The optical cable module according to claim 2, wherein the light-receiving element has a shape with a longitudinal axis in an expanding direction of output light when there is a bending in the optical waveguide.

9. The optical cable module according to claim 3, wherein the light-receiving element has a shape with a longitudinal axis in an expanding direction of output light when there is a bending in the optical waveguide.

10. An apparatus comprising: the optical cable module according to claim 2.

11. An apparatus comprising: the optical cable module according to claim 3.

12. An apparatus comprising: the optical cable module according to claim 4.

13. An apparatus comprising: the optical cable module according to claim 5.

14. An apparatus comprising: the optical cable module according to claim 6.

* * * * *